(12) United States Patent
Hagiwara et al.

(10) Patent No.: US 10,334,124 B2
(45) Date of Patent: Jun. 25, 2019

(54) INFORMATION PROCESSING APPARATUS, NON-TRANSITORY COMPUTER READABLE MEDIUM, AND INFORMATION PROCESSING SYSTEM FOR PRINT JOB MANAGEMENT

(71) Applicant: FUJI XEROX CO., LTD., Tokyo (JP)

(72) Inventors: Nobuki Hagiwara, Kanagawa (JP); Koichi Naito, Kanagawa (JP); Makoto Kondo, Kanagawa (JP); Hirofumi Ogawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/659,622

(22) Filed: Jul. 26, 2017

(65) Prior Publication Data
US 2018/0109686 A1 Apr. 19, 2018

(30) Foreign Application Priority Data
Oct. 17, 2016 (JP) ................ 2016-203502

(51) Int. Cl.
*G06F 3/12* (2006.01)
*H04N 1/00* (2006.01)
*H04N 1/32* (2006.01)

(52) U.S. Cl.
CPC ......... *H04N 1/0023* (2013.01); *G06F 3/1204* (2013.01); *G06F 3/126* (2013.01); *G06F 3/1276* (2013.01); *G06F 3/1288* (2013.01); *H04N 1/00204* (2013.01); *H04N 1/00344* (2013.01); *H04N 1/00474* (2013.01); *H04N 1/00503* (2013.01); *H04N 1/32507* (2013.01); *H04N 1/32529* (2013.01); *G06F 3/1267* (2013.01); *G06F 3/1273* (2013.01); *H04N 2201/0039* (2013.01); *H04N 2201/0094* (2013.01); *H04N 2201/3202* (2013.01)

(58) Field of Classification Search
None
See application file for complete search history.

(56) References Cited

U.S. PATENT DOCUMENTS

2011/0299120 A1* 12/2011 Sekine .................. G06F 3/1221
    358/1.15
2015/0178022 A1* 6/2015 de la Pena .............. G06F 3/126
    358/1.15
2016/0378406 A1* 12/2016 Kaku .................... G06F 3/1205
    358/1.15

FOREIGN PATENT DOCUMENTS

JP        2004-215945        8/2004

\* cited by examiner

*Primary Examiner* — Henok Shiferaw
(74) *Attorney, Agent, or Firm* — JCIPRNET

(57) ABSTRACT

An information processing apparatus to which plural image forming apparatuses having different functions are connected and which transfers a print job transmitted from a terminal apparatus of a user to the image forming apparatus usable by the user, includes a generation unit that generates a model group of the image forming apparatus usable by the user, for each user.

14 Claims, 15 Drawing Sheets

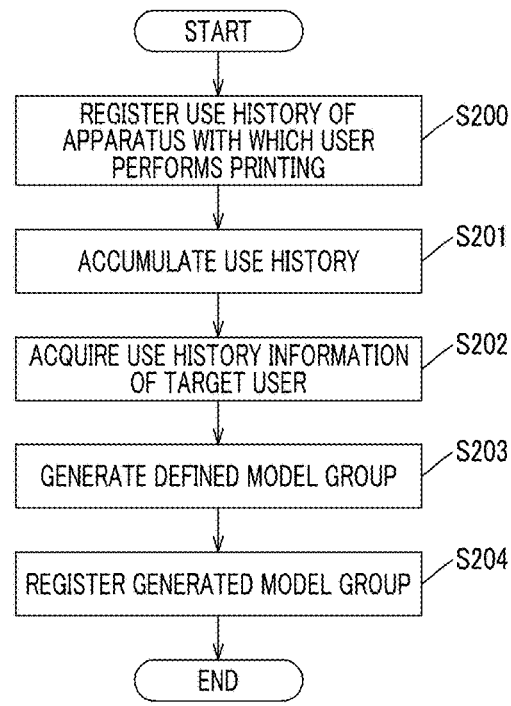

US 10,334,124 B2

INFORMATION PROCESSING APPARATUS, NON-TRANSITORY COMPUTER READABLE MEDIUM, AND INFORMATION PROCESSING SYSTEM FOR PRINT JOB MANAGEMENT

CROSS-REFERENCE TO RELATED APPLICATIONS

This application is based on and claims priority under 35 USC 119 from Japanese Patent Application No. 2016-203502 filed Oct. 17, 2016.

BACKGROUND

Technical Field

The present invention relates to an information processing apparatus, a non-transitory computer readable medium, and an information processing system.

SUMMARY

According to an aspect of the present invention, there is provided an information processing apparatus to which plural image forming apparatuses having different functions are connected and which transfers a print job transmitted from a terminal apparatus of a user to the image forming apparatus usable by the user, including a generation unit that generates a model group of the image forming apparatus usable by the user, for each user.

BRIEF DESCRIPTION OF THE DRAWINGS

Exemplary embodiment(s) of the present invention will be described in detail based on the following figures, wherein:

FIG. 10 is a flowchart illustrating an example of a method for automatically generating a model group in the exemplary embodiment of the present invention;

FIG. 11 is an explanatory diagram illustrating an example of accumulated use history records;

DETAILED DESCRIPTION

Figure 1:
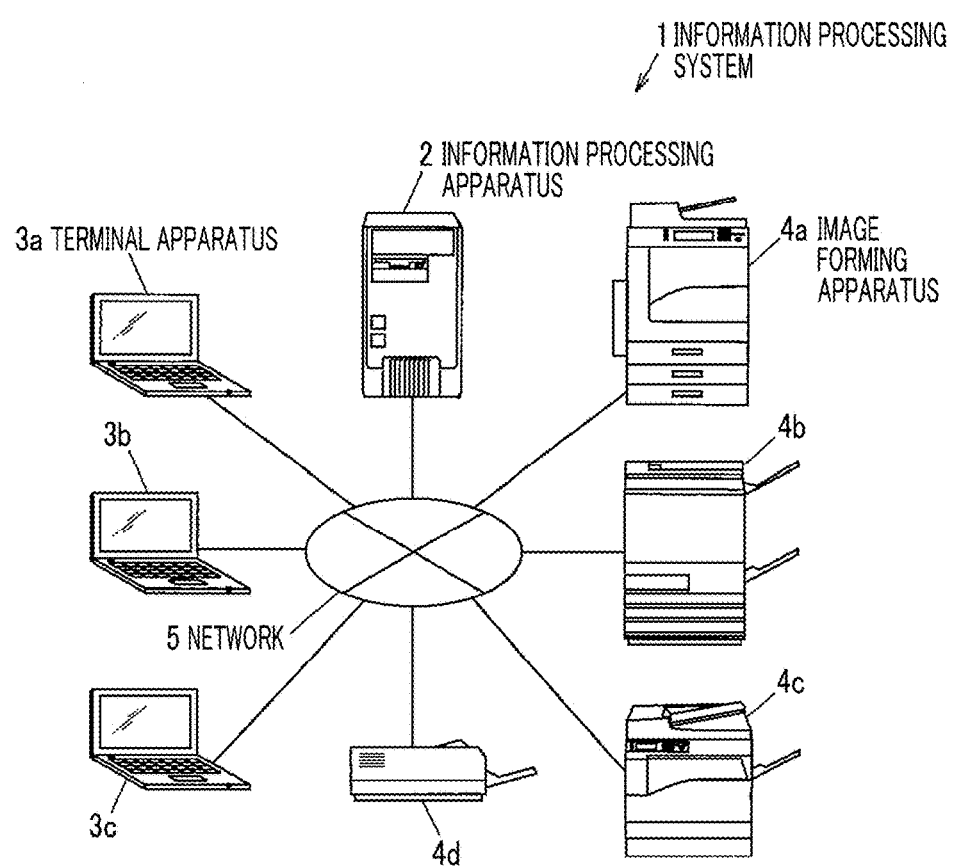
FIG. 1 is a diagram illustrating a schematic configuration of an information processing system according to an exemplary embodiment of the present invention.

FIG. 1 is a diagram illustrating a schematic configuration of an information processing system according to an exemplary embodiment of the present invention.

As shown in FIG. 1, in the information processing system 1 of the present exemplary embodiment, an information processing apparatus 2, plural terminal apparatuses 3a, . . . , 3c and plural image forming apparatuses 4a, . . . , 4d are connected to a network 5. Hereinafter, the plural terminal apparatuses 3a, . . . , 3c and the plural image forming apparatuses 4a, . . . , 4d may be simply referred to as the terminal apparatus 3 and the image forming apparatus 4.

Each terminal apparatus 3 is used by each user, and the information processing apparatus 2 transfers the print job transmitted from the terminal apparatus 3 of the user, to the image forming apparatus 4 that the user can use. The plural image forming apparatuses 4 are different in models and functions, respectively, and receive print jobs from the information processing apparatuses 2 and perform printing.

In this manner, the information processing system 1 forms a so-called pull printing system that outputs the print job temporarily stored in the information processing apparatus 2 in response to the print request from the image forming apparatus 4. In the pull printing system, since the information processing apparatus 2 collectively manages the image forming apparatus 4 and its printer driver, it is easy for each user to use plural image forming apparatuses 4.

However, under the pull printing environment in which different models are mixed, at the time when the user starts printing, the model of the image forming apparatus 4 to output the print job is not determined, and there is a possibility that the user cannot obtain the desired print result.

Therefore, in the exemplary embodiment, models and functions corresponding to the needs of each user are provided, by generating a model group of the image forming apparatuses 4 usable by each user, for each user. The generation of the configuration and model group of each apparatus will be described in detail below.

Figure 2:
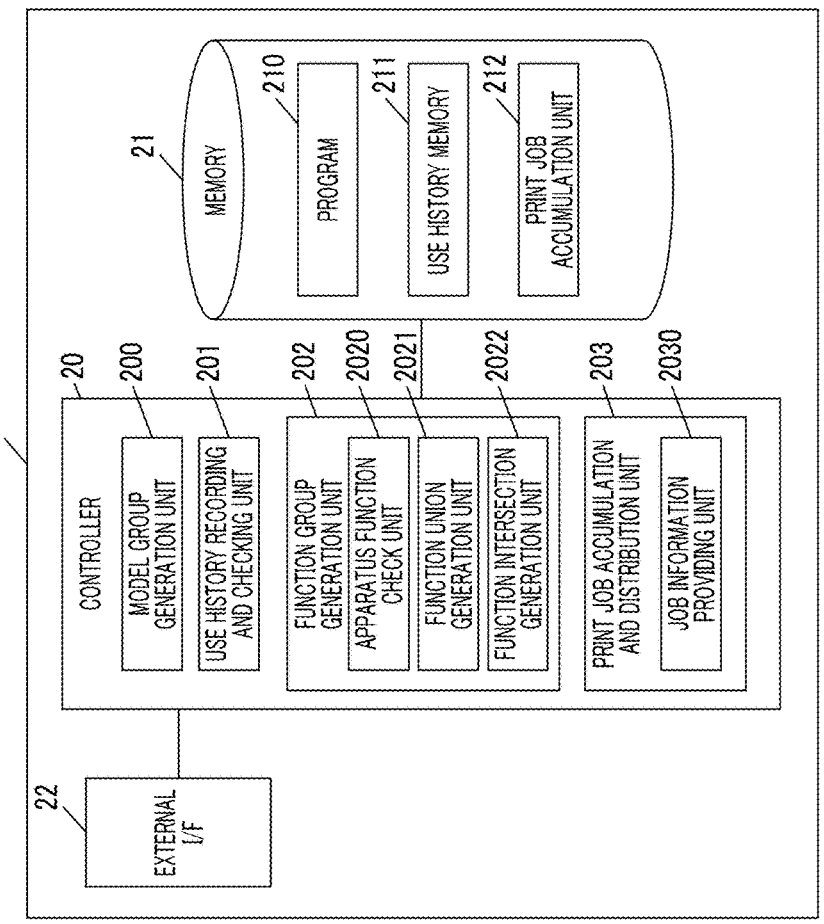
FIG. 2 is a diagram illustrating a schematic configuration of an information processing apparatus according to the exemplary embodiment of the present invention.

FIG. 2 is a diagram illustrating a schematic configuration of an information processing apparatus 2 according to an exemplary embodiment of the present invention. As shown in FIG. 2, the information processing apparatus 2 includes a controller 20, a memory 21, an external interface (external I/F) 22, and the like.

The controller 20 is configured with a CPU and the like, and controls each unit and executes various programs. The controller 20 includes a model group generation unit 200, a use history recording and checking unit 201, a function group generation unit 202, and a print job accumulation and distribution unit 203.

The function group generation unit 202 includes an apparatus function check unit 2020, a function union generation unit 2021, and a function intersection generation unit 2022. Further, the print job accumulation and distribution unit 203 includes a job information providing unit 2030.

The memory 21 is configured with a recording medium such as a hard disk and a flash memory and stores various types of information, and includes a program 210, a use history memory 211, and a print job accumulation unit 212. The program 210 causes the controller 20 to function as the model group generation unit 200, the use history recording and checking unit 201, the function group generation unit 202, and the print job accumulation and distribution unit 203.

The external I/F 22 communicates with the terminal apparatus 3, the image forming apparatus 4, and other external apparatuses through the network 5.

The model group generation unit 200 automatically generates a model group from plural image forming apparatuses 4 depending on each user.

As the information used by the model group generation unit 200 to automatically generate the model group, the use history recording and checking unit 201 checks information on the use history of the image forming apparatus 4 such as the output destination model, the output date and time, and the activated application, and records the information in the use history memory 211. That is, the use history recording and checking unit 201 corresponds to a management unit that manages information on the image forming apparatus 4 including the use history of the user on the image forming apparatus 4.

The function group generation unit 202 generates a function group to be provided to the user from the selected model group and the function mode described below. The function group generation unit 202 includes an apparatus function check unit 2020 that checks the function of each image forming apparatus 4, a function union generation unit 2021 that generates union of functions as functions usable in any of the image forming apparatuses 4, and a function intersection generation unit 2022 that generates an intersection of functions as function common in the image forming apparatuses 4.

The print job accumulation and distribution unit 203 accumulates the print job output from the terminal apparatus 3 of the user in the print job accumulation unit 212 and distributes the print job. The print job accumulation and distribution unit 203 includes a job information providing unit 2030 that provides setting information of accumulated print jobs. In a case where the setting of the print job includes a function that cannot be executed, the job information providing unit 2030 prevents output from a model in which the setting function is unavailable. That is, the job information providing unit 2030 corresponds to a controller that controls printing of the received print job, based on the information on the image forming apparatus 4, and prevents the output from the image forming apparatus 4 of the model in which the function is unavailable.

Figure 3:
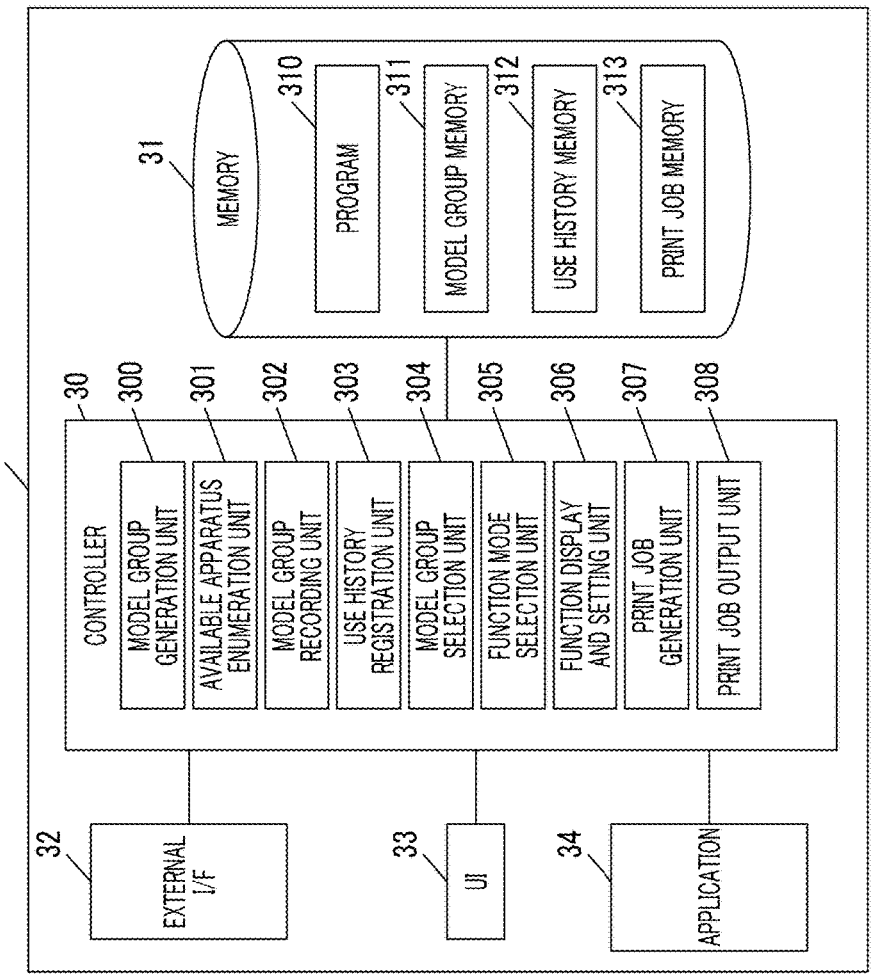
FIG. 3 is a diagram illustrating a schematic configuration of a terminal apparatus according to the exemplary embodiment of the present invention.

FIG. 3 is a diagram illustrating a schematic configuration of the terminal apparatus 3 according to an exemplary embodiment of the present invention. As shown in FIG. 3, the terminal apparatus 3 of the present exemplary embodiment includes a controller 30, a memory 31, an external interface (external I/F) 32, a user interface (UI) 33, an application 34, and the like.

The controller 30 is configured with a CPU and the like, and controls each unit and executes various programs. The controller 30 includes a model group generation unit 300, an available apparatus enumeration unit 301, a model group recording unit 302, a use history registration unit 303, a model group selection unit 304, a function mode selection unit 305, a function display and setting unit 306, a print job generation unit 307, and a print job output unit 308.

The memory 31 is configured with a recording medium such as a hard disk and a flash memory and stores various types of information, and includes a program 310, a model group memory 311, a use history memory 312, and a print job memory 313. The program 310 causes the controller 30 to function as the model group generation unit 300, the available apparatus enumeration unit 301, the model group recording unit 302, the use history registration unit 303, the model group selection unit 304, the function mode selection unit 305, the function display and setting unit 306, the print job generation unit 307, and the print job output unit 308.

The available apparatus enumeration unit 301 is used to enumerate the image forming apparatuses 4 that can be used by the user. The model group generation unit 300 is a unit that generates a model group by the user manually selecting the image forming apparatus 4 from the image forming apparatuses 4 enumerated by the available apparatus enumeration unit 301. The model group recording unit 302 records the generated model group in the model group memory 311.

The use history registration unit 303 is used to register the use history of the image forming apparatus 4 used by the user for printing, and registers information such as the output destination model, the output date and time, and the activated application in the use history recording and checking unit 201 of the information processing apparatus 2.

The model group selection unit 304 selects an arbitrary model group from plural model groups stored in the model group memory 311.

The function mode selection unit 305 selects a function mode. Here, the function modes include a common mode and a full mode. The common mode is a function that can be commonly used in all the models included in the model group, and corresponds to taking the intersection of functions. The full mode is a function that can be used in any of the models included in the model group, and corresponds to taking the union of functions.

The function display and setting unit 306 displays each function and option such that the user makes the setting. The above-described model group selection unit 304, function mode selection unit 305, and function display and setting unit 306 make the user perform selection and setting through the UI 33.

The print job generation unit 307 generates a print job, and the print job output unit 308 outputs the generated print job to the information processing apparatus 2.

In the example described above, the use history recording and checking unit 201, the function group generation unit 202, and the model group generation unit 200 that automatically generates a model group are disposed on the information processing apparatus 2 side, but these modules may be disposed on the terminal apparatus 3 side.

Figure 4:
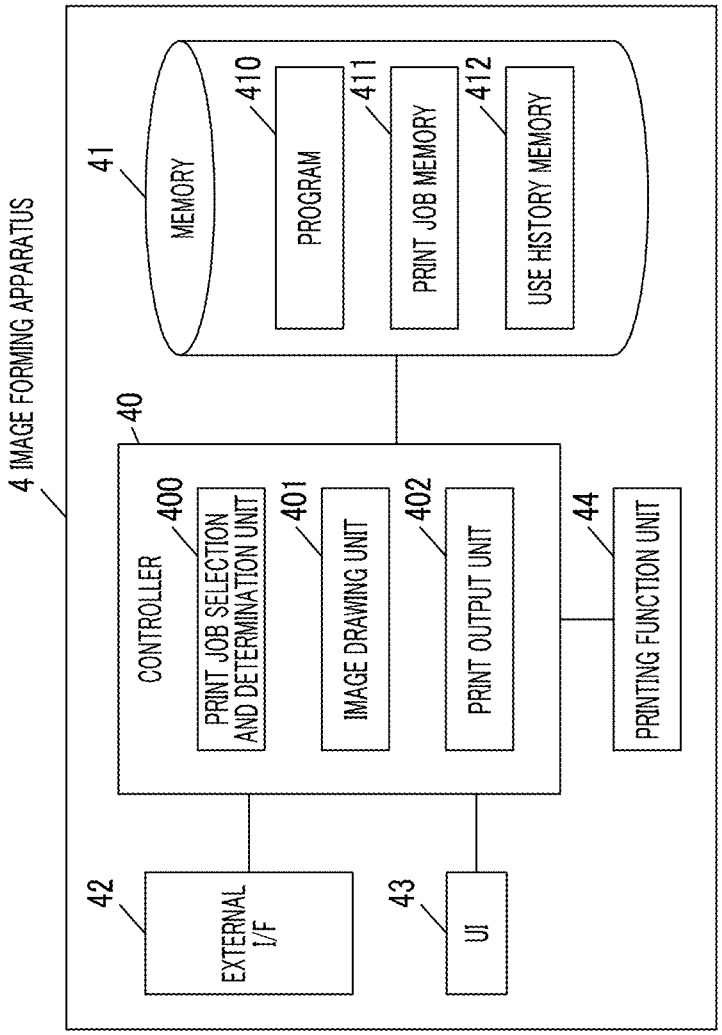
FIG. 4 is a diagram illustrating a schematic configuration of an image forming apparatus according to the exemplary embodiment of the present invention.

FIG. 4 is a diagram illustrating a schematic configuration of an image forming apparatus according to the exemplary embodiment of the present invention. As shown in FIG. 4, the image forming apparatus 4 includes a controller 40, a memory 41, an external interface (external I/F) 42, a user interface (UI) 43, a printing function unit 44, and the like.

The controller 40 is configured with a CPU or the like, and controls each unit and executes various programs. The controller 40 includes a print job selection and determination unit 400, an image drawing unit 401, a print output unit 402, and the like. The memory 41 includes a program 410, a print job memory 411, a use history memory 412, and the like.

The UI 43 is configured with, for example, a touch panel, and is an operation and display including an operation unit and a display. In a case where printing is performed by the image forming apparatus 4, the user selects a job to be printed from the print jobs accumulated in the information processing apparatus 2 through the UI 43 and the printing is performed.

The print job selection and determination unit 400 is used for the user to glance at the print jobs accumulated in the information processing apparatus 2 through the UI 43, and select and determine a job to be printed. At this time, as described above, in a case where the setting of the print job includes a function that cannot be executed, the job information providing unit 2030 of the information processing apparatus 2 may prevent output from a model in which the setting function is unavailable.

Various methods are conceivable as a method for preventing the output. For example, by comparing the setting information items of the print jobs accumulated in the information processing apparatus 2 with the function of the image forming apparatus 4, it may be displayed that printing cannot be performed when selecting a print job of pull printing, or such a job may not be displayed in the list of print jobs. In addition, a warning may be issued in a case where the user gives a print instruction. For this, it is conceivable to warn the function whose setting is invalid at the time of job selection. In this warning, information on functions that cannot be executed in printing is displayed, and it is displayed whether the user instructs to continue printing as it is or to cancel printing. When the user instructs continuation of printing, unavailable functions may be canceled and printing is executed. In addition, it is possible to recommend the user to perform printing on another model capable of executing the function which is unavailable in the model of the image forming apparatus 4.

The image drawing unit 401 draws image data that can be printed by the printing function unit 44 in response to the print instruction. The print output unit 402 outputs the drawing data generated by the image drawing unit 401 to the printing function unit 44. The printing function unit 44 actually prints the print instruction, and prints out document data on a recording medium such as paper by an electrophotographic method, an ink-jet method, or the like.

Operation of Exemplary Embodiment

Hereinafter, the operation of the present exemplary embodiment will be described.

(1) Case of Manually Generating a Model Group

First, a case where a model group is generated manually will be described. The generation of the model group of the image forming apparatus 4 is, for example, as shown in FIG. 5, classifying plural image forming apparatuses 4a, . . . , 4e into model groups by specifying a model for each purpose, when there are plural image forming apparatuses 4a, . . . , 4e.

Figure 5:
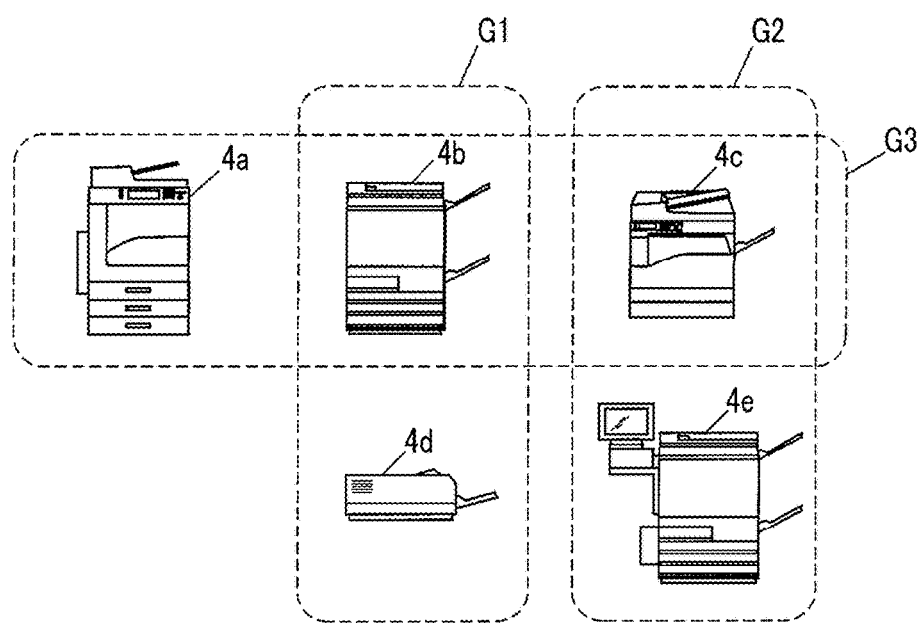
FIG. 5 is an explanatory diagram illustrating an example of model groups of the image forming apparatuses in the exemplary embodiment of the present invention.

In the example shown in FIG. 5, the five image forming apparatuses 4a, . . . , 4e are divided into three model groups which partially overlap each other. For example, a model group G1, a model group G2, and a model group G3 are configured with models with full functions, models of an energy saving type, and models on the same floor in the building, respectively. Information on the model group can be imported or exported as a file of data. In addition, the administrator may prepare model groups in advance and distribute them to general users, and the user may import and set the model groups.

Figure 6:
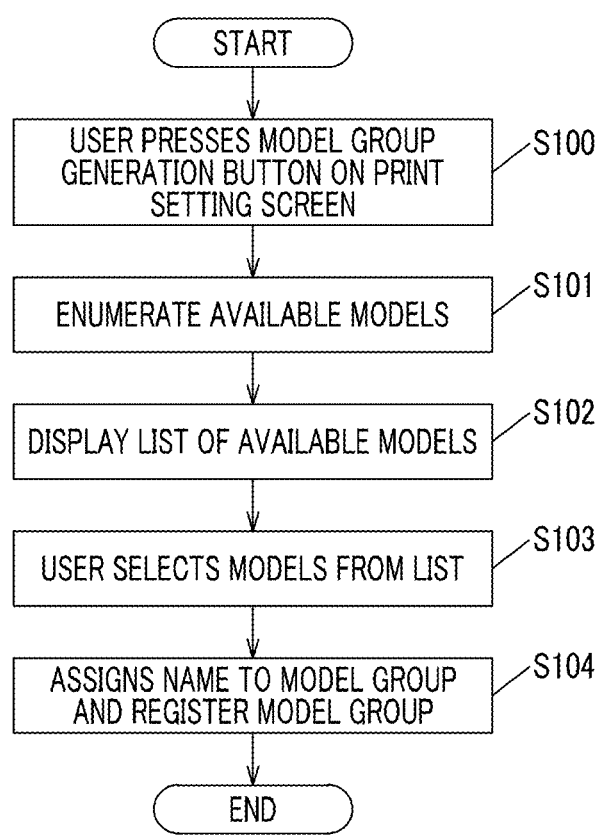
FIG. 6 is a flowchart illustrating an example of a method for manually generating a model group in the exemplary embodiment of the present invention.

FIG. 6 is a flowchart illustrating an example of a method for manually generating a model group in the exemplary embodiment of the present invention.

First, the user presses a [model group generation] button on a print setting screen of a printer driver in the terminal apparatus 3 (S100).

Figure 7:
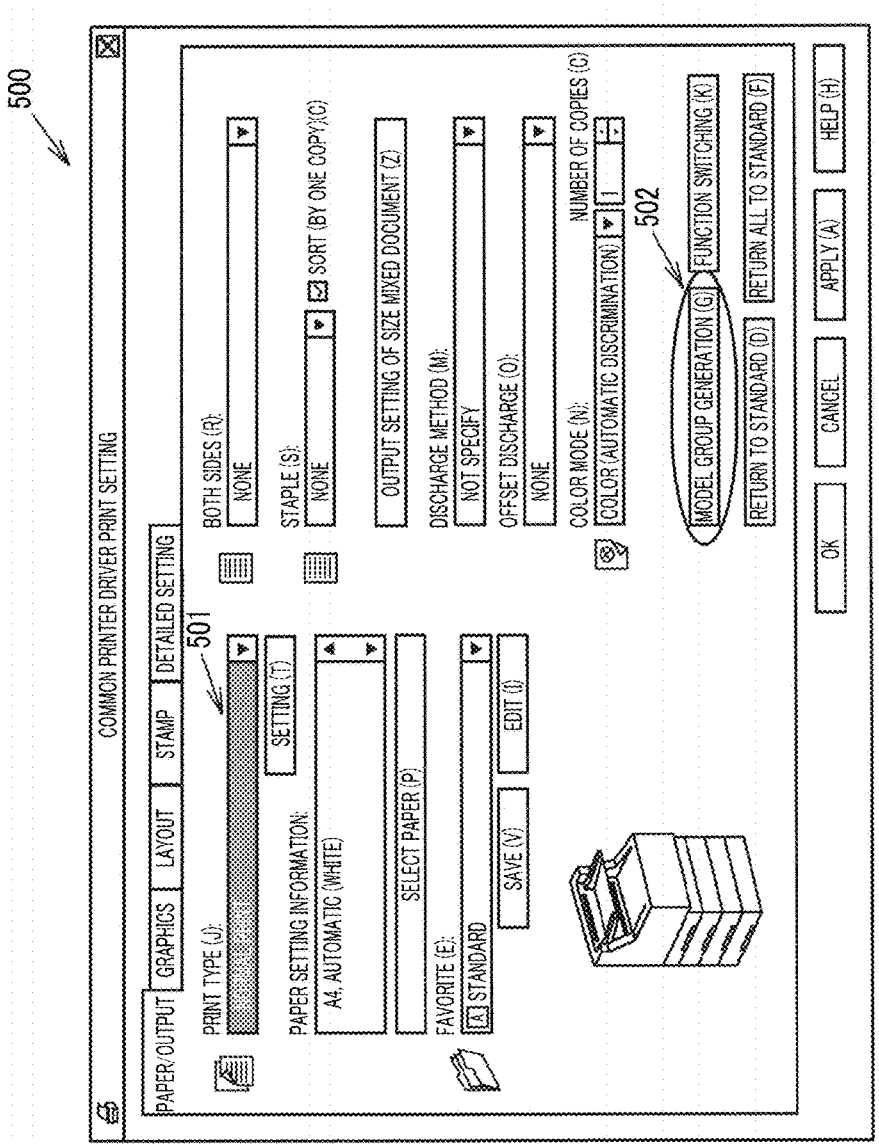
FIG. 7 is an explanatory diagram illustrating an example of a print setting screen.

FIG. 7 shows an example of the print setting screen. On the print setting screen 500 of FIG. 7, "normal print" is selected as the print type 501. If the user presses the [model group generation] button 502 on the print setting screen 500, the model group generation unit 300 is activated and a dialog screen for "model group generation" is displayed.

Figures 8, 9:
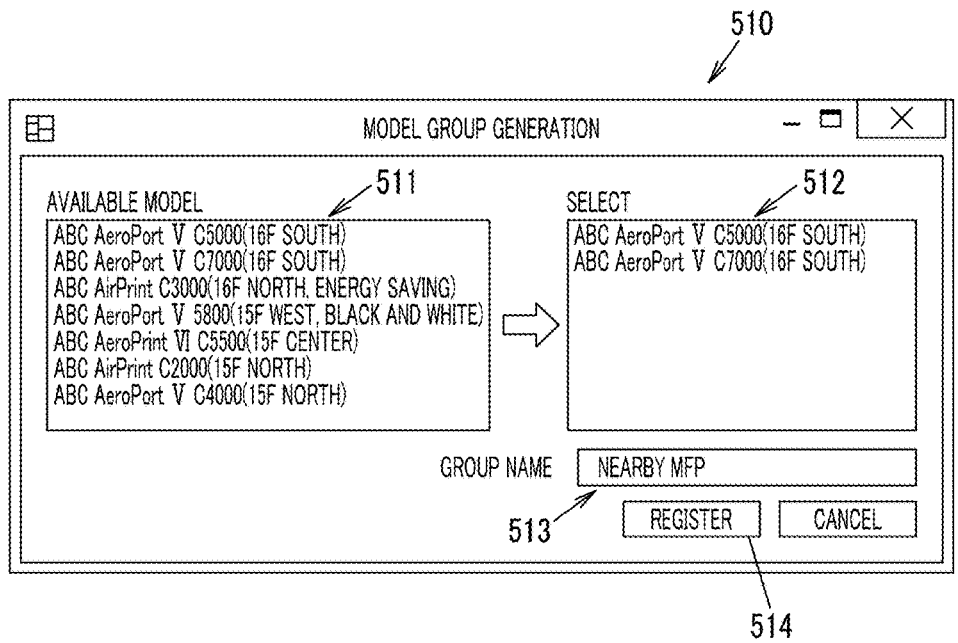
FIG. 8 is an explanatory diagram illustrating an example of a dialog screen for model group generation.
FIG. 9 is an explanatory diagram illustrating an example of registered model groups.

FIG. 8 is an explanatory diagram illustrating an example of a dialog screen for model group generation. The available apparatus enumeration unit 301 enumerates available models (S101), and displays a list of available models as "available models" 511 on the dialog screen 510 (S102).

The user selects models constituting the model group from among the enumerated available models 511 (S103). For example, it is assumed that the user is on the south side of the 16th floor of the office. Therefore, if the user selects a model located close to the user to make it easy to use, two selected models disposed on the south side of the 16-th floor are displayed as "select" 512 in the dialog screen 510.

The user assigns an appropriate "group name" to the model group and registers the model group (S104). For example, if the user inputs the name "nearby MFP" 513 as "group name" for the model group and presses the "register" button 514 below the group name, the model group recording unit 302 records the model group "nearby MFP" in the model group memory 311.

FIG. 9 shows an example of the registered model group data. As shown in FIG. 9, the registered data 520 includes two models of the group name 521 "nearby MFP" and the model 522.

(2) Case of Automatically Generating a Model Group

Next, an operation for automatically generating a model group will be described.

FIG. 10 is a flowchart illustrating an example of a method for automatically generating a model group in the exemplary embodiment of the present invention.

In a case of automatically generating a model group, information on the image forming apparatus 4, such as the use history of the image forming apparatus 4 with which the user performs printing is stored in advance for each user, and the model group Is generated based on these pieces of information.

The information such as the use history is registered in the use history recording and checking unit 201 of the information processing apparatus 2 from the use history registration unit 303 of the terminal apparatus 3 (S200). In addition, the image forming apparatus 4 may store the use history of each user in the use history memory 412 and the use history recording and checking unit 201 may acquire the use history from the use history memory 412.

The use histories registered in the use history recording and checking unit 201 or acquired by the use history recording and checking unit 201 are accumulated in the use history memory 211 (S201).

FIG. 11 shows an example of accumulated use history records. As shown in FIG. 11, a use history record 530 includes a user 531 who uses the model, an output destination model 532, a used date 533, and an used application 534.

Next, the use history recording and checking unit 201 acquires the history information of the target user who generates the model group from the use history memory 211, and transmits the use history information of the target user to the model group generation unit 200 (S202).

Next, the model group generation unit 200 generates a defined model group, based on the transmitted use history information of the target user (S203). Here, the defined model group is, for example, a model group which is recently used, specifically, a group of models used within the last week or ten days, and a frequently used model group, specifically, a group of models that used ten times or more within one month. In addition, the type of model to be made as the defined model group may be editable by the user.

Figure 12:
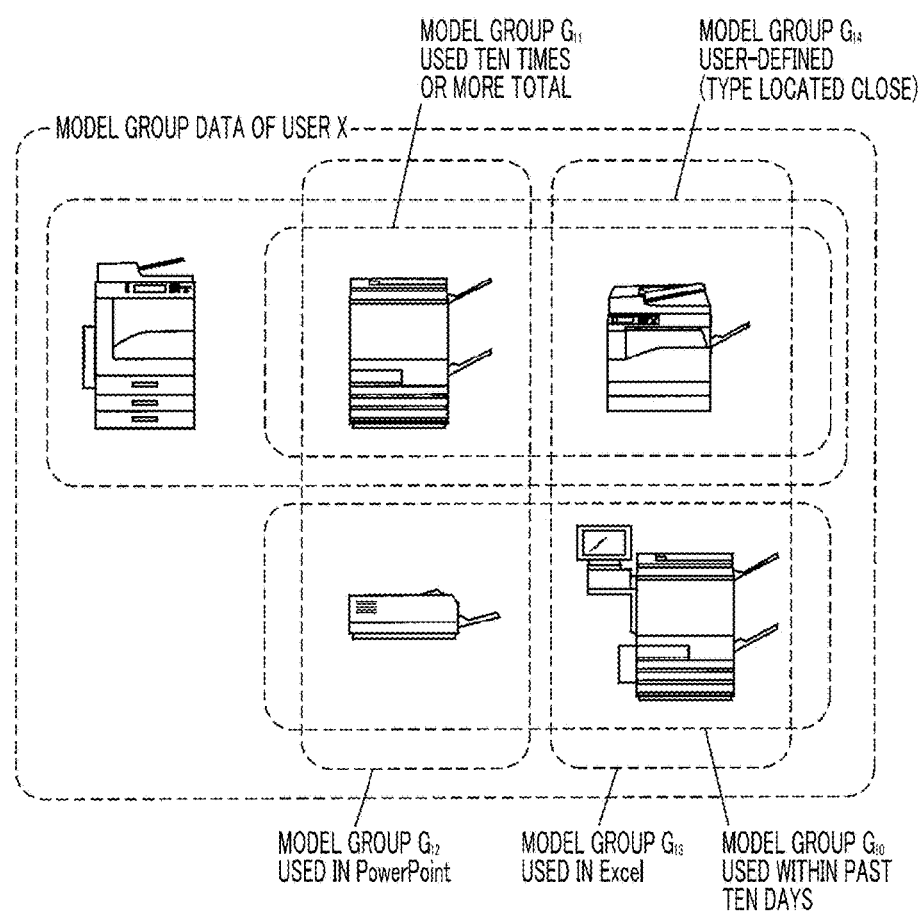
FIG. 12 is an explanatory diagram illustrating an example of model groups which are automatically generated.

FIG. 12 shows an example of the model groups generated automatically. In FIG. 12, model groups are generated in such a manner that the model group G10 is a model group used within the past ten days, the model group G11 is a model group used ten times or more total, the model group G12 is a model group which performs output using Power-Point (trademark of Microsoft Corporation) as an application, the model group G13 is a model group which performs output using Excel (trademark of Microsoft Corporation) as an application, and the model group G14 is a user-defined model group which is located close to the user.

When automatically selecting a model group located close to the user, information on the user's residential area and information on the location where the image forming apparatus 4 is located are required, but the method of obtaining these pieces of information is not particularly limited.

The model group generation unit 200 registers the generated defined model group in the model group recording unit 302 (S204). The model group recording unit 302 stores the generated model group in the model group memory 311.

(3) Function Group Selection Operation

Figure 13:
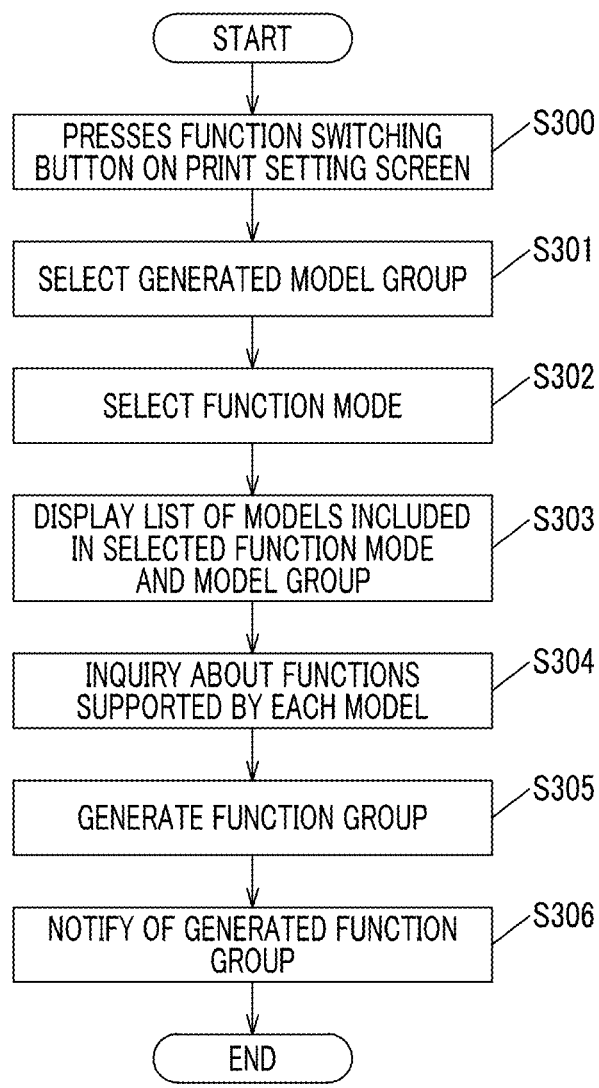
FIG. 13 is a flowchart illustrating an example of an operation of selecting a function in the exemplary embodiment of the present invention.

Next, an operation of selecting a function group from each model included in a model group will be described. FIG. 13 is a flowchart illustrating an example of an operation of selecting a function in the exemplary embodiment of the present invention.

First, if the user presses a [function switching] button on the print setting screen of the printer driver of the terminal apparatus 3, the model group selection unit 304 and the function mode selection unit 305 are activated, and a dialog screen for function switching setting is displayed (S300).

Figure 14:
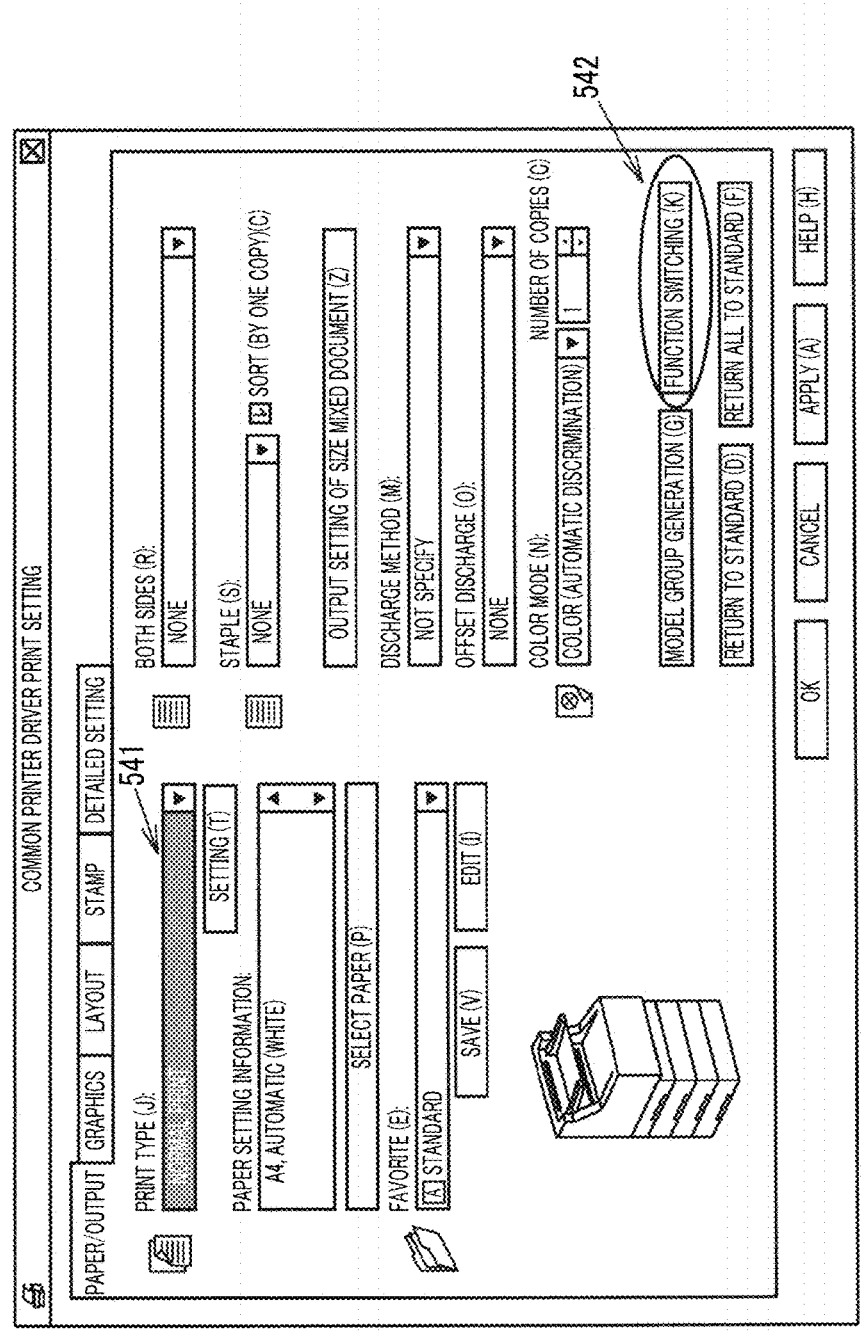
FIG. 14 is an explanatory diagram illustrating an example of a print setting screen.

FIG. 14 shows an example of a print setting screen. As shown in FIG. 14, "normal print" is set as the print type 541 and the [function switching] button 542 is pressed on the print setting screen 540, a dialog screen for function switching setting is displayed.

Figure 15:
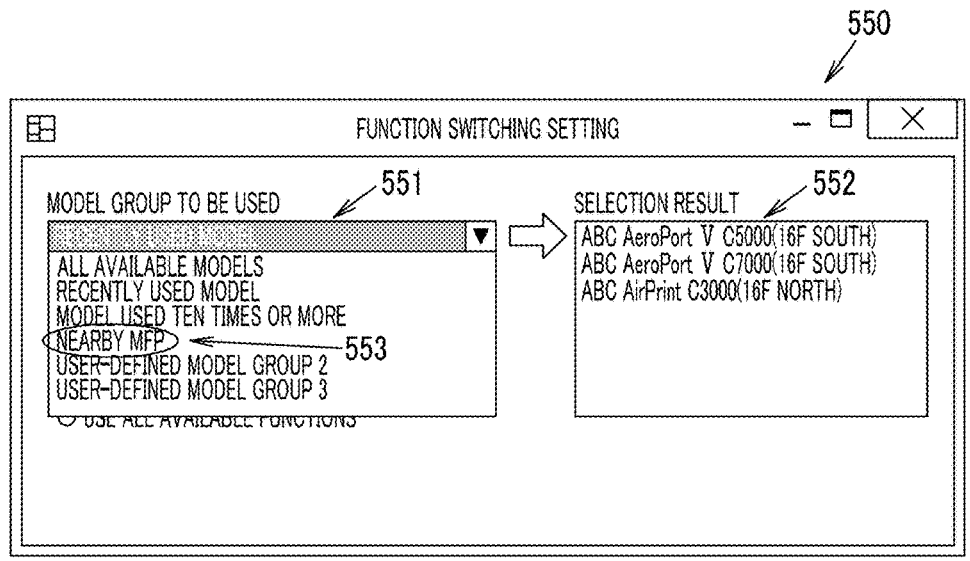
FIG. 15 is an explanatory diagram illustrating an example of a dialog screen for function switching setting.

FIG. 15 shows an example of a dialog screen for function switching setting. As shown in FIG. 15, the generated "model group to be used" 551 is displayed on the dialog screen 550 for function switching setting, and if "recently used model group" is selected among them, three models are displayed as items of the "recently used model group" in the selection result 552 on the right side thereof.

In this way, the user selects one model group from the generated "model group to be used" 551 on the dialog screen 550 for function switching setting (S301). For example, if "nearby MFP" 553 is selected as the "model group to be used" 551, models included in the "nearby MFP" model group are displayed.

Figure 16:
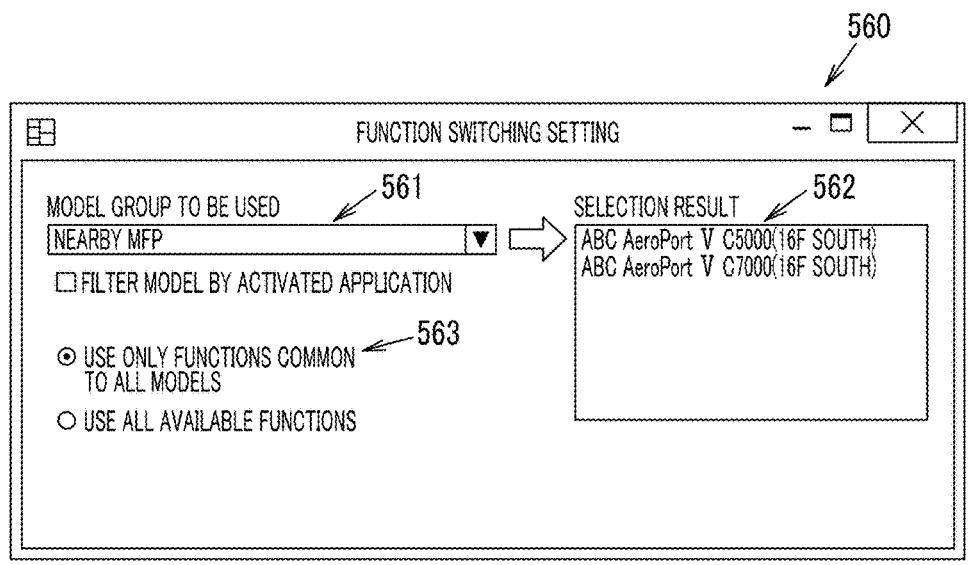
FIG. 16 is an explanatory diagram illustrating another example of the dialog screen for function switching setting.

That is, as shown in FIG. 16, if "nearby MFP" is selected as the "model group to be used" 561 on the dialog screen 560 for function switching setting, two models included in the "nearby MFP" model group in the "selection result" 562 are displayed on the right side.

In addition, "use only functions common to all models" or "use all available functions" is selected as the function mode (S302). In the example shown in FIG. 16, as the function mode, functions common to all models, that is, functions as the intersection of the functions of models included in the model group are selected by the radio button 563 "use only functions common to all models".

If the model group and the function mode are selected, the list of these selected models is displayed as the selection result 552 in FIG. 15 or the selection result 562 in FIG. 16 (S303).

The function group generation unit 202 inquires of the apparatus function check unit 2020 about the functions supported by each model included in the list of selected models (S304).

The function group generation unit 202 generates a function group in response to the instruction of the function mode (S305). A function group is generated from the inquiry result by using the function union generation unit 2021 in a case where the selected function mode is "use all available functions", and by using the function sum using the function intersection generation unit 2022 in a case where the function mode is "use only functions common to all models". In the example shown in FIG. 16, "use only functions common to all models" is selected, so that the function intersection generation unit 2022 is used.

The function group generation unit 202 notifies the function display and setting unit 306 of the generated function group (S306). That is, the function group generation unit 202 corresponds to a notification unit that notifies the terminal apparatus 3 of the user of the function usable by the corresponding user, for the model group of the image forming apparatus 4. The function display and setting unit 306 updates the functions and options presented to the user, according to the notified function group.

In addition, as the function mode, it may be determined which of the intersection function of "use only functions common to all models" and the union function of "use all available functions" is selected as the default, according to the selected model group. For example, in a case where each model included in the selected model group has a relatively simple functional configuration and a function difference is small, the union function is a default. In a case where each model included in the model group has a relatively high functional configuration and a function difference is large, the intersection function is a default.

In addition, in a case where model group "nearby model" is selected, even if the model selected as the output destination cannot perform output as set, models that can perform output as set are located nearby and thus a union function may be a default.

In addition, the user may be notified of specific models which are included in the currently selected model group at the time of printing. In addition, although a list of models included in each model group is displayed on the print setting screen at the time of print setting, there are cases where printing is performed without actually opening the print setting screen. In this case, a pop-up screen may be displayed at the time of printing to notify the user of the names and locations of the models included in the model group.

(4) Operation of Image Forming Apparatus

Figure 17:
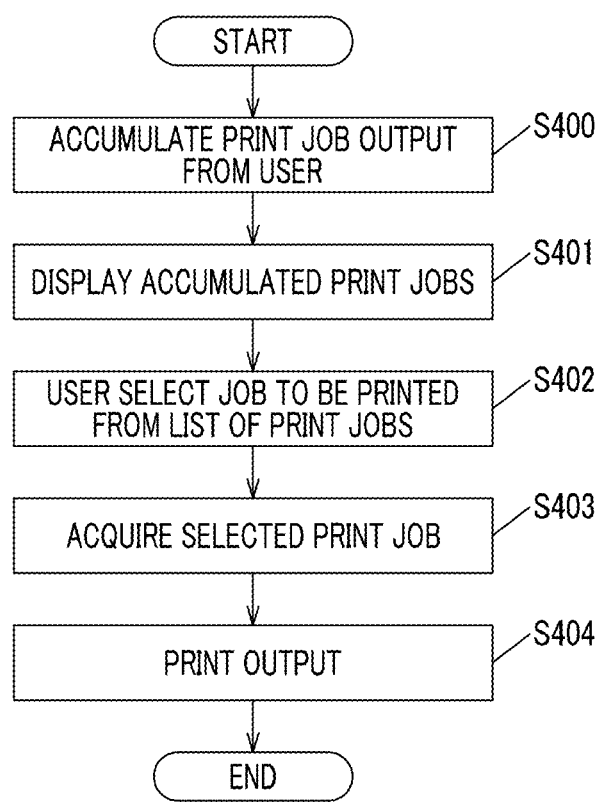
FIG. 17 is a flowchart illustrating an example of a printing operation of the image forming apparatus.

Next, the printing operation of the image forming apparatus 4 will be described. FIG. 17 is a flowchart illustrating an example of a printing operation of the image forming apparatus.

The print job accumulation unit 212 of the information processing apparatus 2 accumulates the print job output from the user (S400).

In response to a request from the image forming apparatus 4, the print job accumulation and distribution unit 203 transmits a list of accumulated print jobs to the image forming apparatus 4 and displays the list on the UI 43 of the image forming apparatus 4 (S401).

The user selects a job to be printed from the list of print jobs displayed on the UI 43 (S402). Then, the image forming apparatus 4 acquires the print job selected by the user from the information processing apparatus 2 (S403). The acquired print job may once be temporarily stored in the print job memory 411.

If the image drawing unit 401 generates drawing data from the print job and passes the drawing data to the print output unit 402, the print output unit 402 outputs the drawing data to the printing function unit 44. Then, the printing function unit 44 performs print output (S404).

(Application Example of Selection of Function Group)

Next, an application example of selection of a function group will be described.

In the above-described exemplary embodiment, the function to be provided to the user is switched depending on the selected model group. That is, an intersection of functions is used by using only the common functions of the models included in the model group selected by the user, or the union of functions is used by using all available functions. In addition thereto, a filtering may be applied to the functions that are further provided by the activated application.

For example, in the case of the model group data shown in FIG. 12, when selecting the model group G10 and further selecting an application activated in PowerPoint (trademark of Microsoft Corporation) as an application, the model of the intersection (common part) of the model group G10 and the model group G12 is the target model.

Figure 18:
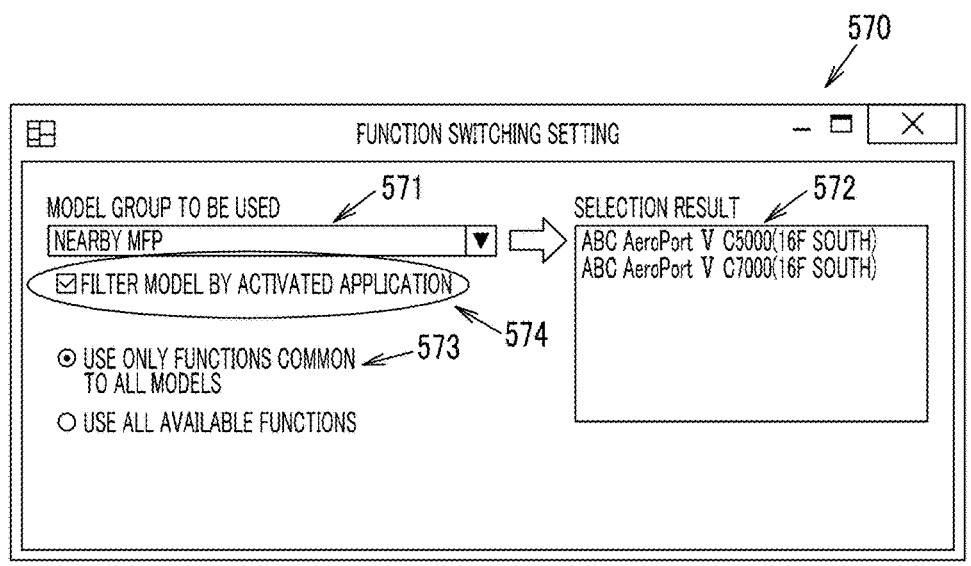
FIG. 18 is an explanatory diagram illustrating an example of a function switching setting screen in an application example of selection of a function group.

Further, referring to the function switching setting screen 570 in FIG. 18, in a case where "nearby MFP" is selected as "model group to be used" 571 and "use only functions common to all models" 573 is selected as the function mode, if "filter a model by activated application" 574 is selected, the function mode selection unit 305 notifies the function group generation unit 200 of the application which activates the print setting.

Then, the function group generation unit 200 generates a function group by adding a use history in the notified application as a condition for generating the function group. The result is displayed in the selection result 572.

Although the exemplary embodiment of the present invention have been described above, the present invention is not limited to the above exemplary embodiment, and various modifications are possible without departing from the spirit of the present invention. For example, in the above exemplary embodiment, the program 210 is stored in the memory 21 of the information processing apparatus 2, but the program 210 may be stored in a recording medium such as a CD-ROM or the like and provided.

Although the information processing apparatus 2 accumulates data and performs automatic model group generation in the above-described exemplary embodiment, it is possible to configure such that the terminal apparatus 3 of the user accumulates data and performs automatic model group generation. Further, it is also possible to configure such that the terminal apparatus 3 or the image forming apparatus 4 concurrently has the role of the information processing apparatus 2.

Parts or all of the units constituting the controllers 20 and 30 may be configured with hardware circuits such as a field programmable gate array (FPGA) and an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus to which a plurality of image forming apparatuses having different functions are connected and which transfers a print job transmitted from a terminal apparatus of a user to the image forming apparatus usable by the user, comprising:
 a controller, configured to:
 generate a plurality of model groups of the image forming apparatus respectively with different common attributes comprising applications of which the print job is created, for each user, wherein the model groups of the image forming apparatus are generated from the image forming apparatuses;
 in response to a selection operation performed on a designated model group among the model groups of the image forming apparatus, display each image forming apparatus of the designated model group of the image forming apparatus on the terminal apparatus for selection; and
 in response to another selection operation performed on a designated image forming apparatus in the designated model group of the image forming apparatus, transfer the print job to the designated image forming apparatus to print the print job.

2. The information processing apparatus according to claim 1, wherein the controller is further configured to:
 manage information on the image forming apparatus including use history of the user on the image forming apparatus,
 wherein the controller generates the model group of the image forming apparatus based on the use history of the user.

3. The information processing apparatus according to claim 1, wherein the controller is further configured to:
 notify the terminal apparatus of the user of the function usable by the corresponding user, for the model group of the image forming apparatus.

4. The information processing apparatus according to claim 2, wherein the controller is further configured to:
 notify the terminal apparatus of the user of the function usable by the corresponding user, for the model group of the image forming apparatus.

5. The information processing apparatus according to claim 1, wherein the controller controls printing of a received print job, based on information on the image forming apparatus.

6. The information processing apparatus according to claim 2, wherein the controller controls printing of a received print job, based on information on the image forming apparatus.

7. The information processing apparatus according to claim 3, wherein the controller controls printing of a received print job, based on information on the image forming apparatus.

8. The information processing apparatus according to claim 4, further comprising:
wherein the controller controls printing of a received print job, based on information on the image forming apparatus.

9. The information processing apparatus according to claim 5,
wherein the controller prevents output from the image forming apparatus of a model in which a function is unavailable.

10. The information processing apparatus according to claim 6,
wherein the controller prevents output from the image forming apparatus of a model in which a function is unavailable.

11. The information processing apparatus according to claim 7,
wherein the controller prevents output from the image forming apparatus of a model in which a function is unavailable.

12. The information processing apparatus according to claim 8,
wherein the controller prevents output from the image forming apparatus of a model in which a function is unavailable.

13. A non-transitory computer readable medium storing a program causing a computer of an information processing apparatus to which a plurality of image forming apparatuses having different functions are connected and which transfers a print job transmitted from a terminal apparatus of a user to the image forming apparatus usable by the user, to;
generate a plurality of model groups of the image forming apparatus respectively with different common attributes comprising applications of which the print job is created, for each user, wherein the model groups of the image forming apparatus are generated from the image form apparatuses;
in response to a selection operation performed on a designated model group among the model groups of the image forming apparatus, display each image forming apparatus of the designated model group of the image forming apparatus on the terminal apparatus, and
in response to another selection operation performed on a designated image forming apparatus in the designated model group of the image forming apparatus, transfer the print job to the designated image forming apparatus to print the print job.

14. An information processing system comprising:
a terminal apparatus of a user;
a plurality of image forming apparatuses having different functions; and
an information processing apparatus,
wherein the terminal apparatus, the image forming apparatuses, and the information processing apparatus are connected to each other through a network,
wherein the information processing apparatus transfers a print job transmitted from the terminal apparatus of a user to the image forming apparatus usable by the user,
wherein the information processing apparatus generates a plurality of model groups of the image forming apparatus respectively with different common attributes comprising applications of which the print job is created, for each user, wherein the model groups of the image forming apparatus are generated from the image forming apparatuses,
wherein in response to a selection operation performed on a designated model group among the model groups of the image forming apparatus, the information processing apparatus displays each image forming apparatus of the designated model group of the image forming apparatus on the terminal apparatus for selection, and
in response to another selection operation performed on a designated image forming apparatus in the designated model group of the image forming apparatus, transfer the print job to the designated image forming apparatus to print the print job.

* * * * *